(12) United States Patent
Heikkila et al.

(10) Patent No.: US 12,257,629 B2
(45) Date of Patent: Mar. 25, 2025

(54) APPARATUS AND METHODS FOR SINTERING

(71) Applicant: Tundra Composites, LLC, White Bear Lake, MN (US)

(72) Inventors: Kurt Heikkila, Marine on the Saint Croix, MN (US); Rodney Williams, Stacy, MN (US)

(73) Assignee: Tundra Compoistes, LLC, White Bear Lake, MN (US)

( * ) Notice: Subject to any disclaimer, the term of this patent is extended or adjusted under 35 U.S.C. 154(b) by 136 days.

(21) Appl. No.: 17/315,607

(22) PCT Filed: Dec. 7, 2020

(86) PCT No.: PCT/US2020/063576
§ 371 (c)(1),
(2) Date: May 10, 2021

(87) PCT Pub. No.: WO2021/141704
PCT Pub. Date: Jul. 15, 2021

(65) Prior Publication Data
US 2023/0234127 A1 Jul. 27, 2023

Related U.S. Application Data

(60) Provisional application No. 62/959,168, filed on Jan. 9, 2020.

(51) Int. Cl.
*F27B 21/00* (2006.01)
*B22F 3/00* (2021.01)
(Continued)

(52) U.S. Cl.
CPC .............. *B22F 3/003* (2013.01); *F27B 9/36* (2013.01); *F27B 21/00* (2013.01); *F27D 11/06* (2013.01);
(Continued)

(58) Field of Classification Search
CPC .......... B22F 3/003; B33Y 40/20; F27B 21/00; F27B 9/36; F27D 11/06; F27D 11/12; F27D 2099/0015; F27D 2099/0028; Y02P 10/25
(Continued)

(56) References Cited

U.S. PATENT DOCUMENTS 3,656,910 A 4/1972 Ferment
3,680,625 A 8/1972 Hein et al.
(Continued)

FOREIGN PATENT DOCUMENTS

DE 2630819 A1 1/1977
EP 0640060 A1 3/1995
(Continued)

OTHER PUBLICATIONS

Capus Joesph, M. et al., Sintering, Advances in Powder Metallurgy and Particulate Materials, 1992, vol. 3, pp. 1-14, Metal Powder Industries Federation, Princeton, NJ, USA.
(Continued)

*Primary Examiner* — Quang T Van
(74) *Attorney, Agent, or Firm* — Mark DiPietro; Fred Morgan

(57) ABSTRACT

Disclosed is an apparatus and methods for sintering particulate to make a workpiece.

10 Claims, 4 Drawing Sheets

FIG. 2

(51) Int. Cl.
*F27B 9/36* (2006.01)
*F27D 11/06* (2006.01)
*F27D 11/12* (2006.01)
*B33Y 40/20* (2020.01)
*F27D 99/00* (2010.01)

(52) U.S. Cl.
CPC .............. *F27D 11/12* (2013.01); *B33Y 40/20* (2020.01); *F27D 2099/0015* (2013.01); *F27D 2099/0028* (2013.01)

(58) Field of Classification Search
USPC ....... 373/140, 138, 144, 152, 154, 157, 158, 373/161, 162, 164, 165
See application file for complete search history.

(56) References Cited

U.S. PATENT DOCUMENTS

| | | | |
|---|---|---|---|
| 3,696,223 | A | 10/1972 | Metcalf et al. |
| 3,739,067 | A | 6/1973 | Stahr et al. |
| 4,174,462 | A | 11/1979 | Pearce |
| 4,231,796 | A | 11/1980 | Clark et al. |
| 4,263,336 | A | 4/1981 | Thompson et al. |
| 4,608,473 | A * | 8/1986 | Paek .................... C03B 37/029 65/435 |
| 4,720,615 | A | 1/1988 | Dunn |
| 4,741,748 | A | 5/1988 | Lane et al. |
| 4,818,833 | A | 4/1989 | Formanack et al. |
| 5,072,087 | A | 12/1991 | Apte et al. |
| 5,157,232 | A | 10/1992 | Pfaffmann |
| 5,198,489 | A | 3/1993 | Sterzel et al. |
| 5,502,743 | A | 3/1996 | Conochie et al. |
| 5,641,920 | A | 6/1997 | Hens et al. |
| 5,713,979 | A * | 2/1998 | Nicholson ........... C03B 37/0146 65/540 |
| 5,808,282 | A | 9/1998 | Apte et al. |
| 5,860,055 | A | 1/1999 | Hesse et al. |
| 6,271,509 | B1 | 8/2001 | Dalton |
| 6,361,597 | B1 | 3/2002 | Takase et al. |
| 6,528,771 | B1 | 3/2003 | Matsen et al. |
| 6,724,803 | B2 | 4/2004 | Miller et al. |
| 7,110,430 | B2 | 9/2006 | Lazor |
| 7,113,535 | B2 | 9/2006 | Tenzek et al. |
| 7,153,594 | B2 | 12/2006 | Kejzelman et al. |
| 7,625,420 | B1 | 12/2009 | Kodas et al. |
| 8,236,420 | B2 | 8/2012 | Skarman et al. |
| 8,247,249 | B2 * | 8/2012 | Strittmatter ....... H01L 21/02458 257/E21.09 |
| 9,364,775 | B2 | 6/2016 | Chamyvelumani et al. |
| 9,457,403 | B2 | 10/2016 | Holcomb |
| 10,273,567 | B2 | 4/2019 | Isaac |
| 2001/0045426 | A1 | 11/2001 | Eberhardt et al. |
| 2002/0148829 | A1 | 10/2002 | Fishman |
| 2006/0193978 | A1 | 8/2006 | Toth |
| 2008/0267251 | A1 | 10/2008 | Gerszewski et al. |
| 2010/0282166 | A1 * | 11/2010 | Fukuda .............. C23C 16/45578 118/722 |
| 2011/0068700 | A1 | 3/2011 | Fan |
| 2011/0168700 | A1 | 7/2011 | Ripley |
| 2012/0104665 | A1 | 5/2012 | ter Maat et al. |
| 2017/0175234 | A1 * | 6/2017 | Jennett .................... C22C 30/00 |
| 2018/0051931 | A1 | 2/2018 | Fornoff et al. |
| 2018/0104740 | A1 | 4/2018 | Yamamoto et al. |
| 2018/0117676 | A1 | 5/2018 | Lindroos et al. |
| 2020/0292235 | A1 | 9/2020 | Hauptmann |

FOREIGN PATENT DOCUMENTS

| | | |
|---|---|---|
| EP | 640060 B1 | 9/1996 |
| EP | 0743289 A1 | 11/1996 |
| EP | 2993434 A1 | 3/2016 |
| WO | 9311655 A1 | 6/1993 |
| WO | 9631090 A1 | 10/1996 |
| WO | 2005046290 A1 | 5/2005 |
| WO | 2016177935 A1 | 11/2016 |
| WO | 2018098435 A1 | 5/2018 |

OTHER PUBLICATIONS

Capus, Joesph, The New Benefits of Binder Lubricants, pp. 11-12, Nov./Dec. 2011, metal-powder.net, Elsevier Ltd.
Catamold Feedstock for Metal Injection Molding: Processing—Properties—Applications, Technical Information BASF AG, May 2003, pp. 1-13, BASF AG.
Fox, Richard T., Optimization of Metal Injection Molding Experimental Design, The International Journal of Powder Metallurgy, 1990, pp. 233-243, vol. 26, No. 3.
German, R.M., Prediction of Sintered Density for Bimodal Powder Mixtures, May 1992, pp. 1455-1465, vol. 23A.
German, Randall, M., The Role of Particle Packing Density in Powder Injection Molding, Reviews of Powder Metallurgy and Physical Ceramics pp. 81-110, 5, Elsevier, England, May 1992.
Gonzalez-Gutierrez, Joamin et. al., Powder INjection Molding of Metal and Ceramic Parts, Center for Experimental Mechanics, pp. 65-88, University of Ljubljana, Ljubljana, Slovenia, Mar. 2008.
Nakamura Hidefumi et al., Effect of a slight addition of Zr on the sintering behaviour of water-atomised 316L stainless steel powder, Mar. 2011, pp. 60-67, vol. 5 No. 1, Powder Injection Moulding International.
Tudbury Chester A., Basics of Induction Heating,, 1960, 1-132, vol. 1, Pillar Induction, Brookfield, WI, USA.
Yih, Pay et al., Powder Metallurgy Fabrication OF Metal Matrix Composites Using Coated Fillers, International Journal of Powder Metallurgy, 1995, pp. 335-340, vol. 31, No. 4.

* cited by examiner

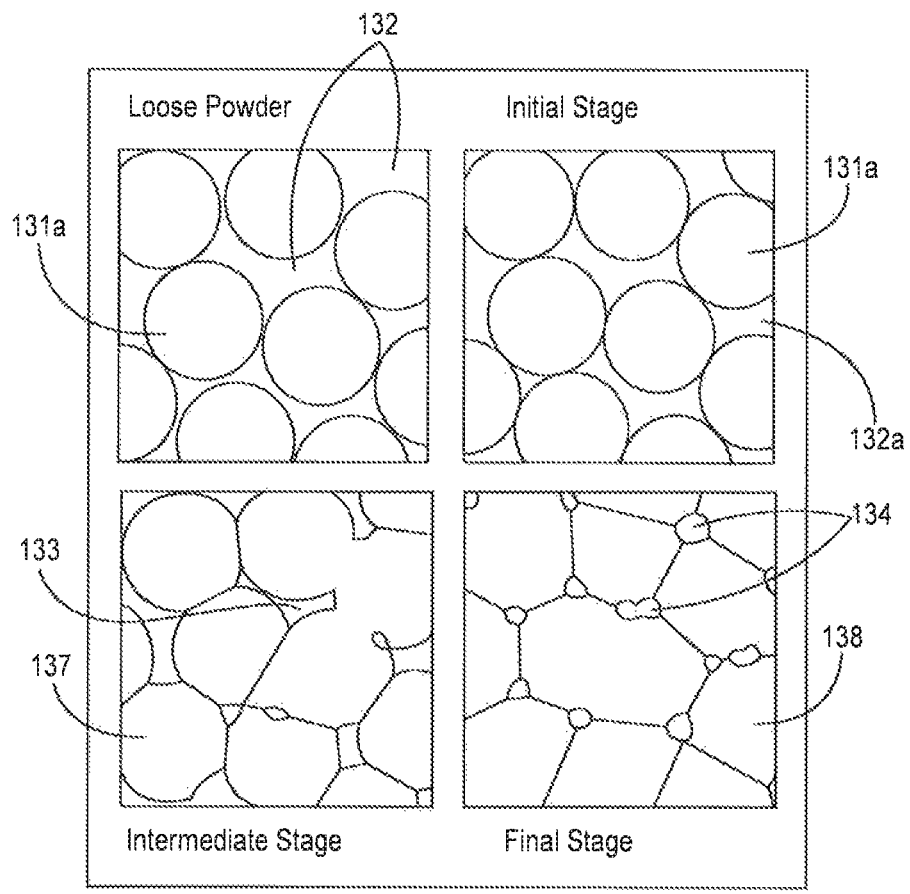
FIG. 3A
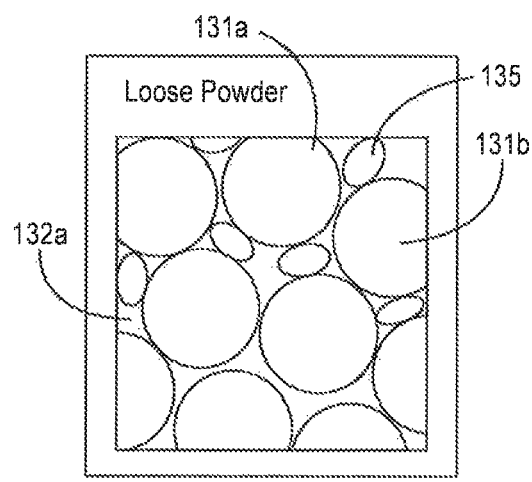 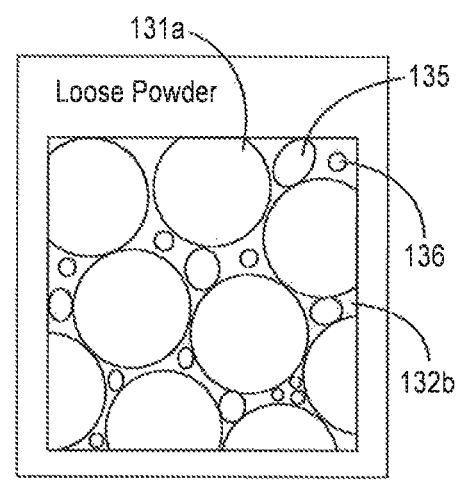
FIG. 3B  FIG. 3C

APPARATUS AND METHODS FOR SINTERING

CROSS REFERENCE TO RELATED APPLICATIONS

This application claims the benefit of a 371-international application PCT/US20/63067, filed Dec. 7, 2020. PCT/US19/63067 claims the benefit of U.S. Provisional Patent Application No. 62/959,168, filed Jan. 1, 2020. All applications are hereby incorporated by reference in their entirety.

FIELD

The claimed furnace structure and process relates to induction heating, and to a method and apparatus for sintering a workpiece. Any shaped metal particulate structure or composite material made by (e.g.) additive manufactured or injection molded in a metallurgical workpiece can be heated and sintered using induction heating to generate controlled substantially uniform infrared radiant heat.

BACKGROUND

Sintering a workpiece requires forming a high temperature heating zone that heats the workpiece to a temperature greater than 500 up to 2000° C. depending on variables such as particulate, shape, or metal. In common embodiments, additive manufactured, and injection molded metallurgical workpieces are widely used to reduce subsequent heating, sizing, and forming operations and to obtain properties not obtainable with conventional methods and materials. Additive manufactured or injection molded metallurgy finds benefits with respect to particulate. Particulate, alloying agents, lubricants and additives are homogenously mixed to a controlled particle size and distribution. Thereafter, the metal particle composition is optionally IM coated, compacted, or pressed, injection molded, or 3D printed into a workpiece required for subsequent sintering and post sintering operations such as machining, polishing, forming, or sizing operations.

Conventionally, sintering operations are conducted in batch-type furnaces or in continuous electrical or fired furnaces. In both types, a suitable vacuum, non-oxidizing or reducing process gas can be supplied to promote and maintain the required sintering operation. In conventional furnaces, the workpiece is exposed to at least some if not most of the incident energy generated by the mechanism using resistive heating. Such furnaces tend to have non-uniform heating zones. Inductive heating is known but such heating can use RF (radio frequency) energy that is absorbed by the workpiece producing localized non-uniform heating. Such heating can be anisotropic and can create hot spots that can distort the workpiece. The workpiece absorbs infrared (IR) and is heated using this mode. For example, many conventional furnaces and processes directly contact the workpiece with radio frequency radiation to generate heat within the piece. Such furnaces and processes tend not to uniformly heat the entire furnace volume and can often produce uneven, non-uniform heating in the piece. This lack of uniformity is in the work piece itself and in its heating environment.

Further, one aspect involves the use of a reducing gas or other atmosphere (not ambient) is often introduced in both the pre-heating and sintering zones. The gas flow rate exhausts the volatiles and maintains the reducing or non-oxidizing environment at the requisite purity to obtain a piece with optimized quality. Conventional processes have a much longer duration of processing and require larger capital equipment to perform the sintering function.

Our review of the existing commercial furnaces for sintering includes furnaces that use non-cylindrical wire-type heating elements. The heating elements are typically linear members that are shaped into elements that are not cylindrical but attempt to be conformed to an arrangement that heats a volume. The commercial elements heat by electrical resistance, are not truly cylindrical and cannot heat uniformly. These conventional heating elements have minimal mass, are not in themselves susceptor, and are not used in conjunction with susceptors. Carbolite, furnaces are made in Germany and use resistive heaters to heat a heating zone to obtain somewhat uniform temperature profiles.

There is a substantial need for processes and apparatuses that provide uniform infrared heating, do not create unnecessary currents in the workpiece and anisotropic heating, have shorter processing durations and a smaller equipment footprint to provide a sintered article.

SUMMARY

A furnace and method for sintering a workpiece to form a finished sintered workpiece or metal article is disclosed. The minimum requirements are a heating zone contained within a susceptor to convert RF (radio frequency) energy to heat. The susceptor is contained within a coil that conducts electricity to generate RF energy, such as kilohertz current that quickly and uniformly heats the susceptor to a pre-heating and sintering temperatures. The susceptor then radiantly heats a zone and any of its contents to a uniform sintering temperature. These minimum elements are combined with other structural and electrical elements that protect, insulate, and support the coil, heating zone and workpiece during processing. The susceptor exposes the workpiece to a uniform radiant heat from the susceptor only and shields or excludes any heating of the workpiece by other components such as, for example, by direct RF heating in the metal workpiece. A disclosure of induction heating is seen in *Basics of Induction Heating*, Chester A. Tudbury, (1960) Lib. Cong. Cat. No. 60-8958.

Accordingly, in one embodiment a batch mode furnace is disclosed. Such a furnace can comprise a cylindrical furnace with substantially cylindrical components including susceptor, coil, heating zone, insulation and other container, process, or aspects. The furnace can be equipped with a susceptor that heats and shields the workpiece to prevent or minimize stray RF fields in the heating zone.

One embodiment of the furnace is an RF coil that is apart from and positioned such that the ends of the coils in the furnace that absorbs RF is substantially co-extensive with the susceptor. The furnace technology claimed can be used with a variety of metals, metal alloys, metal carbides and other metallic materials that can be sintered to form a useful part, including iron and iron alloys, steel, titanium and titanium alloys, aluminum and aluminum alloys, copper and copper alloys. Other metallic materials that can be used in the furnaces as claimed, include metal carbides, including tungsten carbide, titanium carbide, and other carbides.

In another embodiment, a progressive induction heating via a susceptor is provided to controllably first debind, if needed, and then sinter and fuse via radiant infrared heat the particulate material comprising the article or workpiece. The pre-formed workpiece, often labelled the "green" workpiece, is produced by varied processing such as additive manufacturing or injection molding. In one mode, the progressive mode, the workpiece is exposed to increasing temperature, either ramped or smoothly increasing temperature, providing a debinding phase. This intermediate step is often labelled the "brown" workpiece, and which is then heated, sintered, until the particulate comprising the article are fully fused to each other. In a further embodiment, the susceptor is made from a material that radiantly heats by infrared energy and shields the target workpiece that is being sintered by absorbing the magnetic fields that are generated by the induction sinter heating process.

Still another objective is the provision of a pre-heating and sintering apparatus and process to fuse the metal particles in some instances coated with an interfacial modifier on the particulate comprising the article to form a completely sintered workpiece or article with physical characteristics substantially equivalent to a comparative solid metal workpiece or article. Applicant's cylindrical susceptor is unique in the available commercial furnaces. The claimed susceptor system has the capability for single or multiple independent heating zones and can be adapted for furnace utilization of 100% radiant heat from the susceptor.

The claimed induction furnace uses a horizontal arrangement. With proper material choice, tube design can be improved. With the appropriate design, the furnace could be adapted to a vertical orientation and can be used in larger diameter heating zones that can be as large as 2 to 20 inches or as small as 2 to 8 inches and often 6 to 8 inches.

The term "current" is used in its conventional sense as a flow of electrons in a material. An "eddy" current is a localized electron flow caused by the presence of an oscillating electromagnetic field in a material.

An "interfacial modifier" (IM) means a material that can coat the surface of particulate but does not react or interact with the polymer or other coated material present in the workpiece or part. In an embodiment the IM has a metal core in its organo-metallic chemistry.

The term "RF" refers to radio frequency energy that can generate heat in a susceptor using electromagnetic energy.

The term "susceptor" is a structure or material having the ability to absorb electromagnetic energy and convert it to heat, or infrared thermal radiation. The electromagnetic energy is typically radiofrequency or microwave radiation. The name is derived from susceptance, an electrical property of materials that measures conversion of electromagnetic energy to heat. The term "cylindrical susceptor" is a structure 113 as shown in FIG. 1 having a length that is coextensive and corresponds to the coil 111, an outside diameter OD, an inside diameter ID that can contain a heating zone and a workpiece, and a wall thickness.

The term "reference depth" is the distance from the surface of the susceptor material to the depth where the induced field strength and current are reduced to 1/e or 37% of their surface values. The power density at this point is $1/e^2$ or 14% of its value at the surface.

The term "green workpiece" refers to the formed workpiece comprising IM coated particulate and optional polymer that obtains a shape prior to sintering. After sintering, the workpiece substantially retains the shape and dimensions as formed during the "green" phase. The "green" workpiece, the unsintered article, is then optionally subjected to debinding, (i.e.) to controlled heating conditions for the initial removal, debinding, of volatile constituents, including dye, lubricant, polymer, or wax, etc. prior to forming the "sintered" workpiece. After the debinding process, a sintering process heat-fuses the particles and removes any remaining volatile components to form the sintered workpiece and obtain the desired properties therein. Such sintering requires accurate control of time, temperature, uniformity of temperature and environment to achieve uniform fusing without melting the metal particulate in any substantial way. The sintered parts can be directed to further machining, pressing and other forming and sizing operations if needed.

The term "workpiece" is an article that can be a complex three-dimensional shape made of many parts or a simple form and made from just one part. The workpiece may be asymmetric. The workpiece, for example, can be gears in a housing.

The term "brown workpiece" refers to a workpiece that is intermediate between the "green" workpiece and the finished or sintered workpiece.

The term "finished workpiece" or the term "sintered workpiece" as used in this disclosure refers to the final workpiece or product of the sinter process. The term refers to the article after sintering. For example, in the final shaped article, after sintering, each interfacially modified particle surface is bonded to at least one other interfacially modified particle surface at a particle to particle bond comprising a combination of the metal of each particle and, in some embodiments, the non-volatile portion of the interfacial modifier.

A finished workpiece or sintered workpiece can have a regular or complex form. The finished workpiece typically is made of fused metal particles having the unique binding structure as described, which comprises metal from the particulate and, in some embodiments. the non-volatile elements from the interfacial modifier remaining after sintering volatilizes organic components.

In the disclosure an inductor is a passive electrical component, a coil, that stores energy in a magnetic field when alternating current (AC) electric current flows through it. The frequency of the AC may vary from 60 cycles per second to several million cycles per second but is often in the kilohertz range at about 1 to 500 kHz. An inductor, often called an induction heating coil or induction coil, can have many sizes and shapes. Some induction coils consist of wire wound into a coil around a core.

The term "heating zone" or 'sintering zone" refers to a volume within the apparatus, furnace, wherein the susceptor provides uniform radiant infrared heat to obtain a temperature enough to sinter the particulate comprising the workpiece into the final sintered workpiece. This zone is a volume containing the workpiece where the heat reaches enough levels of temperature to fuse, or associate, the metal particle cores on the surface of the particulate distributed throughout the part or workpiece. The heat provided by the susceptor is substantially all uniform radiant infrared heat that uniformly heats (i.e.) envelopes the workpiece during either the debinding or sintering processes. There is no substantial heating from other types of stray field heating energy mechanisms such as, for example, RF, magnetic fields, eddy currents or hysteresis. The radiant heat provides a uniform heat to the particulate comprising the workpiece so there are substantially no cool spots within or on the workpiece during the debinding or sintering processes.

The term "preheating zone" refers to an area in the furnace wherein the workpiece can be heated to a temperature somewhat less than the sintering temperature in order to either equilibrate the workpiece to an appropriate temperature prior to the sintering or for the purpose of volatilizing any volatile materials required prior to sintering. The preheating zone is an area where the heat reaches levels of temperature to remove, debind, any residual polymer, additives, lubricants etc. that are used in making the workpiece of the part or workpiece. The pre-heating zone does not reach sintering temperatures. The temperatures for thermal debinding vary (e.g.) between 100° C. and 800° C. Organic components of polymers must be removed completely from the workpiece since carbon delays and can negatively influence the sinter process. Further the qualities of the final product can be negatively impacted by residual carbon from the polymer. The debinding process typically is a time intensive step in the complete production process. The speed of decomposition of the polymers should not exceed the transport velocity of the products of pyrolysis, since an excess pressure of the gaseous pyrolysis products can lead to rips, bubbles and blisters and to the destruction of the "brown" workpiece body as formed from the "green" workpiece body.

The term "debinding" refers to a heating process that removes volatile components including polymer volatiles, additives, process aids such as stabilizers and lubricants.

The term "particle" refers to a single unit of a particulate. The particle may be coated with an interfacial modifier. The term powder is used interchangeably with the term particulate.

The term "particulate" refers to a collection of finely divided particles. The particulate has a range of chemistry, types, sizes, and morphologies. The particulate may have components that are chemically the same or chemically different. The maximum particle size is less than 500 microns. In referring to particle sizes, the term "$D_{50}$ less than 500 micron" means that 50 wt. % of the particulate is less than 500 microns. Similarly, the term "$D_{90}$ of 10 to 100 microns" means that 90 wt. % of the particulate is between 10 and 100 microns.

A workpiece containing the interfacially modified particulate is sintered at elevated temperature to form a sintered workpiece. Particulate refers to the metal, ceramic, inorganic, and glass particulate coated with interfacial modifier as described in U.S. Pat. No. 7,491,35 "Extrusion Method Forming an Enhanced Property Metal Polymer Composite", U.S. Pat. Pub. 2010/0280164 "Inorganic Composite", U.S. Pat. No. 8,841,358 "Ceramic Composite", and U.S. Pat. No. 9,249,283 "Glass Bubble Composite", the contents therein are incorporated by reference in their entireties. In other embodiments the particulate is not coated with an interfacial modifier.

The term "packing density" is a measure of the density of the packed particulate compared to the density of the material. The term "modified particle surface" refers to the presence of the IM on the particle surface or the presence of non-volatile components of the IM in the bonding area on the adjacent particle surfaces after sintering.

The term "coating" refers to any material added to the surface of a particle, which can be but is at least partially to substantially continuous thin coverage on the surface. In the disclosure the coating is often referred to as an interfacial modifier coating. The interfacial modifier coating can be substantial or continuous over the surface of the particle. Useful amounts of interfacial modifier coating range from 0.005 to 8 wt. % or 0.1 to 2 wt. % based on the total weight of the particulate. After sintering, the remaining non-volatile portion from the interfacial modifier can be non-continuous. The non-volatile portion on the surface of the particle can contain a metal core that is different than the chemical identity of the particle.

The term "sinter" or "sintering" refers to a process in which a particulate is heated by controlled direct heat energy to a temperature that causes volatilization of all polymers and volatiles, and particle to particle binding to form a solid. In a sinter process the particle itself does not melt but the energy of surface atoms on the particle causes atomic migration or diffusion among or between adjacent particles to form bonds that cause a solidification at the surface between or among particles. In an embodiment, the temperature is enough to bond particles to each other, to drive off all volatile or organic materials such as organic components of the interfacial modifiers but not so high as to melt or liquefy the bulk of the particulate. In an embodiment, the non-volatile or metal component of the interfacial modifier remains as a surface distribution, component or coating on a particle derived from the interfacial modifier after heating and aids in particle bonding. "Sintering is the process whereby particles fuse together typically below the melting point by atomic transport events. A characteristic feature of sintering is that the rate is very sensitive to temperature. The driving force for sintering is a reduction in the system free energy, manifested by decreased surface curvatures, and an elimination of surface area" (*Powder Metallurgy Science*, 1989, pg. 148). The sintering process described in U.S. Pat. No. 10,052,691 "Surface Modified Particulate and Sintered or Injection Molded Products" is herein incorporated by reference in its entirety.

The term "elevated temperature" refers to a temperature for the thermal process to cause temperature driven particle surface bonding or removal of organic materials such as interfacial modifier moieties. In the heating zone, the radiant infrared heat is uniform and results in a uniform heating penetrating through the particulate comprising the body of the workpiece or object. Sintering is done at a temperature or temperature profile and time enough to cause the particulate to form a solid object. Such workpiece formation can occur by any temperature driven particulate bonding including atomic diffusion, some softening, minimal melting, etc. Intact particle to particle edge fusion occurs without substantial liquefaction of the metal particles. Softening or melting of the particle body is to be avoided. In the substantial absence of polymer, "debinding" step can often be omitted in this technology.

The term "close association" generally refers to the packing of particles or particulate distribution. The interfacial modifier coating provides a homogeneous surface on the particle or particles even if the particles are dissimilar in composition or size. Said surface of a particle, because of its inert character, permits very high volume or weight fraction packing above 70, 72, 74, 82, 87, 88, or 90 volume percent (vol. %) packing. The void content of the finished sintered workpiece is often less than 30, 28, 26, 18, 13, 10, 8, 5, 4, 3, 2, or 1%.

The term "process gas" refers to a gas stream that passes into and fills the heating zone to aid in the sintering of the workpiece. Process gases can be non-oxidizing or reducing gasses. The term "purge gas" refers to a gas material that can be used to flow through the furnace structure to cooperate with other furnace components to prevent thermal deterioration of the furnace components. The purge gas does not enter the heating zone. The heating zone typically contains process gas, while the internal components of the furnace can be protected with the purge gas.

The term "non-oxidizing atmosphere" generally refers to an atmosphere devoid of oxygen or other oxidant uniform and can comprise a substantial vacuum, nitrogen, hydrogen, a noble gas (e.g.) Ar or Ne or mixtures thereof.

The term "reducing atmosphere" also includes nonoxidizing characteristics but also includes the chemical nature that the actions involving electron losses can occur. A "reducing atmosphere" comprises gases such as hydrogen, carbon monoxide, and other gaseous reactants. One aspect of a reducing atmosphere is that it can cause the removal of oxygen from a metal or metal oxide.

The term "or" is generally employed in its inclusive sense including "and/or" unless the content clearly dictates otherwise.

The terms "comprise or comprises" and variations thereof do not have a limiting meaning where these terms appear in the description and claims.

"Include," "including," or like terms means encompassing but not limited to, that is, including and is not exclusive.

BRIEF DESCRIPTION OF FIGURES

FIG. 3 is an artist rendering of the particulate before and after sintering.

DETAILED DESCRIPTION

Figure 1:
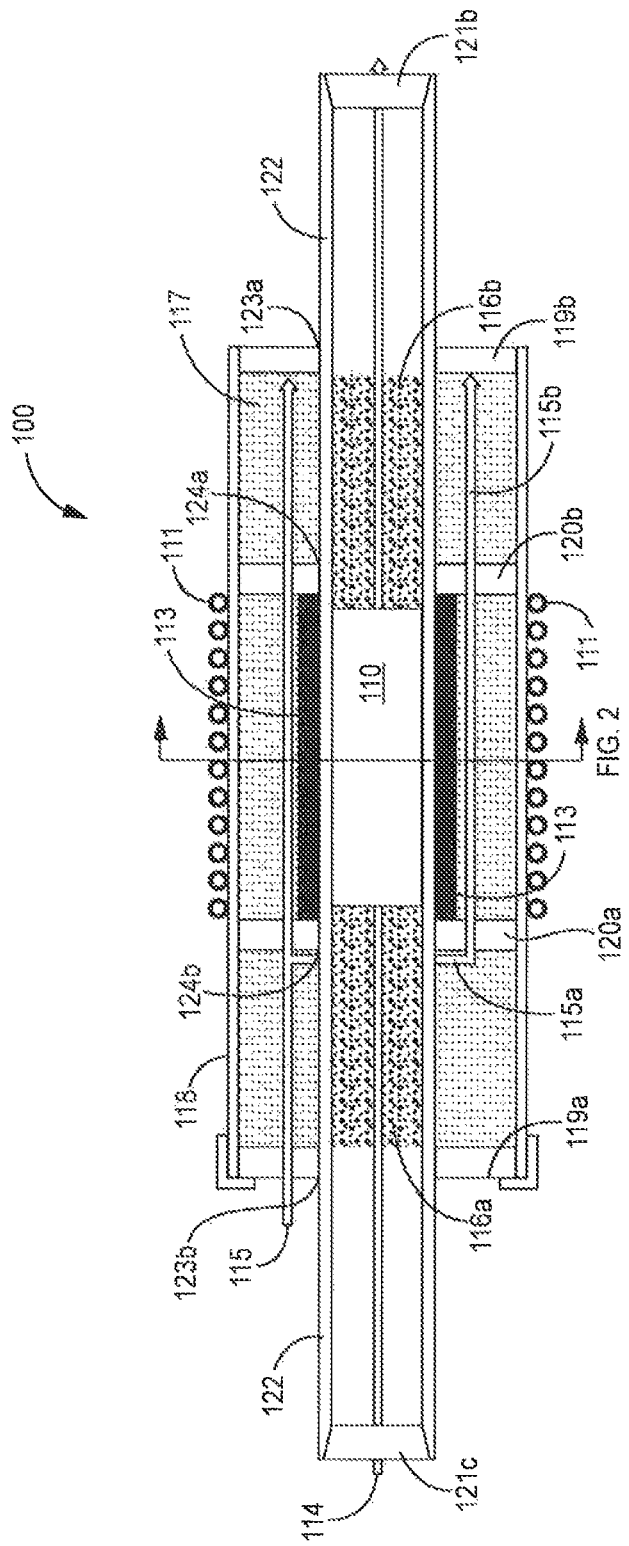
FIGS. 1 and 2 a different views of a cylindrical version of the claimed furnace.

The heating apparatus affords benefits by providing a compact, energy efficient, uniform sintering heating zone. The apparatus accommodates a wide variety and number of metallic parts or complexed shaped workpieces that can be produced in accordance with downstream finishing production processes and rates. The heating apparatus contains at a minimum a coil, and a susceptor surrounding defined a heating chamber with a process atmosphere. The apparatus also can have a containment vessel and electrical and process control(s). By progressively inductively heating the susceptor, the IR heat envelopes the workpiece(s) with a uniform, radiant thermal environment under controlled and monitored conditions. The design provides substantially all radiant heat. There is very little, or no heat generated by other sources than the susceptor, such as eddy currents, in or over the surface of the part or workpiece. In this way the part or workpiece is quickly and evenly pre-heated and densified at the completion of the sintering cycle. The cycle is paced so that workpiece is sintered efficiently and quickly from an entry end to an exit end. The particulate, for example metal particulate, inorganic particulate, ceramic particulate, or glass particulate, with or without a previously applied organic metal containing coating, the metal containing interfacial modifier (IM), can be used. A susceptor is made from a material used for its ability to absorb electromagnetic energy and convert that energy to thermal radiation or heat and acts as an RF shield for the workpiece. The dimensions and material making the susceptor defines how well the susceptor performs in providing radiant heat or thermal energy without other heating mechanisms, useful for debinding and sintering of a workpiece, article or workpiece exposed to the radiant heat generated by the susceptor. The furnace disclosed and claimed is a unique induction furnace that can be used sintering workpieces. The induction sintering process provides continuous and uniform heating in a heating zone that is cylindrical positioned within the furnace body. The heating zone provides fully proportional energy and heating control to heat both the internal volume and the workpiece with infrared heat generated solely by the susceptor. And at the same time, the susceptor shields the workpiece from any electromagnetic RF (radio frequency) energy that can cause non-uniform, anisotropic or asymmetric heating. These advantages obtained from specific designed elements, that are consciously adopted to provide a unique heating environment that involves both a uniform heating and a controlled non-oxidizing or effectively reducing atmosphere.

The induction furnace process provides precise control over a heating profile. Heating profile is the times and temperatures at which the furnace volume is heated in a way such that the temperature rises in a controlled manner to a plateau temperature, at which the sintering of the workpiece is obtained. After a sufficient period to fully sinter the workpiece into a uniform body, the temperature is then controlled such that it reaches ambient temperatures within a controlled period. The examples and data shown below provide evidence that the induction furnace process provides precision temperature control resulting in an improvement sintered product. Since the induction furnace process provides a uniform controlled environment for sintering, the process is not dependent on the nature of the workpiece, the heat within the heating volume is uniform and is precisely controlled.

The induction process can be run in vacuum, in a reducing atmosphere such as hydrogen or carbon monoxide or in a non-oxidizing atmosphere, such as nitrogen or argon. The flow of the atmosphere through the heating zone can be controlled to fully remove any volatiles from the workpiece in a uniform consistent manner. Further, the value of the process can be shown in that the costs of the induction process is comparable to standard tube furnaces but provides significant and unique advantages.

The susceptor used in the induction process is a cylindrical susceptor that surrounds and heats the heating zone within the susceptor with infrared radiant energy developed by the interaction between radio frequency energy and in the susceptor body. The susceptor is a cylindrical workpiece having an interior inside diameter and a wall thickness of about 0.2 to 5 or 0.5 to 2 cm. As a result, the interaction between radio frequency energy and the susceptor produces a continuous and uniform heating along the length and circumference of the susceptor, such that the heating volume within the susceptor is uniformly heated to a controlled temperature without sufficient stray RF energy in the heating volume to cause anisotropic heating The susceptor absorbs the radio frequency energy and the electric and magnetic field associated with the radio frequency energy uniformly and radiantly heats the susceptor body to provide the uniform temperature within the heating zone.

The large thermal mass of the susceptor and its immediate surroundings provide a very smooth and uniform temperature change as the temperature increases to the sintering temperature, and again after sintering is complete the reduction in temperature to ambient also occurs in a smooth and controlled manner.

The induction furnace can include the susceptor hollow cylindrical susceptor body surrounded by an inert covering such as a quartz tube susceptor chamber that protects the user from the high sintering temperatures obtained in the susceptor, but also acts to smooth temperature changes. At each end of the heating zone can be an energy reflector that returns infrared heating back to the workpiece, if any infrared heating contacts the surface of the reflector and if it is not absorbed substantially by the workpiece or part. The heating chamber can contain a base, a support or sintering plate upon which the workpiece is placed, however, the sintering plate does not absorb any heating other than the direct infrared heating from the susceptor. The heating volume is shielded from radio frequency energy by the nature of the cylindrical susceptor.

Surrounding the susceptor outside the (e.g.) quartz tube chamber is an induction coil. The induction coil is connected to a radio frequency generator and its dimensions are sufficient to heat the cylindrical susceptor uniformly from one end to its opposite end of the susceptor. In other words, the induction coil dimensions are adapted to contain the susceptor wholly within the dimensions of the induction coil to obtain uniform heating. The inside diameter and wall thickness of the susceptor are designed such that the internal electrical resistance of the carbon in the susceptor efficiently converts the radio frequency energy into thermal (infrared) energy in a uniform and consistent manner throughout the susceptor, resulting in a uniform heating zone. The heating zone contains an aperture for the introduction of a sintering atmosphere that flows through the sintering chamber from one end to the other end, such that the workpiece is exposed to a uniform concentration of gas or gas mixture.

The tests using the induction furnace concept disclosed herein, provides substantial uniform product. The furnace and controllable temperature profiles such that the workpiece is exposed to uniform heating when heated to a sintering temperature, and when sintering is complete, returning the workpiece to ambient in a controlled manner. Predominantly competitor furnaces do not provide a uniform sintering temperature or effective control during heating and cooling. The testing of the induction furnace shows that the temperature profile of the heating zone within the susceptor is greater than 90% of the heating zone and is substantially uniform. While the temperature at the inside diameter of the susceptor is somewhat higher than the center, that an anisotropic temperature is in less than 5% of the heating volume, or 95 vol. % or 99 vol. % or greater of the heating volume is heated and held to a constant and uniform temperature.

In the comparable commercial furnaces, the temperature gradient within the tube ranges from a very high temperature at the periphery, slowly reducing to a sintering temperature in a relatively small proportion of the internal volume that can be as little as 20 to 40% of the heating volume.

We have found that virtually any sintered alloy can be use in the disclosed induction furnace and moreover any gas or gas mixture can be used independently of the alloy. However, we have discovered that certain gases and gas mixtures can be used in optimizing the sintering process and matched to the specific alloy that is used in the process.

The process can include a first heating step wherein the temperature is increased in the first hour at a rate of about 1 to 20° C. per minute, workable 1 to 5° C. per minute, a first heat soak zone for approximately 1 to 120 minutes, followed by a second heating time at which the temperature has increased at a rate of about 1 to 5° C. per minute until the temperature reaches the appropriate sintering temperature, depending on materials, of about 500 to 2000° C. After a sintering is complete, the temperature is reduced at a controlled rate of about 1 to 20° C. per minute, until reaching ambient, which is typically less than 40° C.

Useful susceptors are normally hollow cylindrical bodies, sleeves, with internal volume enough to contain the work piece. In an embodiment, the susceptor can be machined, cast, or sintered carbon. Both the overall diameter of the coil and the thickness of the cylindrical susceptor with the distance of the coil form the surface of the susceptor are adjusted to maximize heating efficiency. The coil should be close to but not touching the susceptor surface. Minimum length of the coil and susceptor is about 125 mm or 5 inches. The minimum diameter of the coil and OD of the susceptor or containment vessel is 140 mm or 5.5 inches. The minimum dimensions of the OD and ID of the susceptor is about 60 mm or 2.4 inches and 55 mm or 2.2 inches. The minimum length of the machined or cast or sintered carbon susceptor is about 100 mm to 63.5 cm or 4 to 25 inches with a single coil longer can embody two or more coils, the susceptor OD is about 75 to 406 mm, or 3 to 16 inches, the wall thickness can be 3 mm to 13 cm or 0.1 to 5 inches and is matched to a frequency for efficiency. The ratio of wall thickness to OD optimized for efficient heating is determined using the ratios set forth in the following table:

Frequency (kHz) Given Outside Diameter and Ratio of Outside Diameter to Wall Thickness

| | | Ratio of Outside Diameter (OD) to Wall Thickness (T) | | | | | | | | | | |
|---|---|---|---|---|---|---|---|---|---|---|---|---|
| | | 0.06 | 0.08 | 0.10 | 0.12 | 0.14 | 0.16 | 0.18 | 0.20 | 0.22 | 0.24 | 0.26 |
| Outside Diameter (OD, inches) | 3.0 | 34.7 | 40.1 | 44.8 | 49.1 | 53.1 | 56.7 | 60.2 | 63.4 | 66.5 | 69.5 | 72.3 |
| | 3.5 | 37.5 | 43.3 | 48.4 | 53.1 | 57.3 | 61.3 | 65.0 | 68.5 | 71.8 | 75.0 | 78.1 |
| | 4.0 | 40.1 | 46.3 | 51.8 | 56.7 | 61.3 | 65.5 | 69.5 | 73.2 | 76.8 | 80.2 | 83.5 |
| | 4.5 | 42.5 | 49.1 | 54.9 | 60.2 | 65.0 | 69.5 | 73.7 | 77.7 | 81.4 | 85.1 | 88.5 |
| | 5.0 | 44.8 | 51.8 | 57.9 | 63.4 | 68.5 | 73.2 | 77.7 | 81.9 | 85.9 | 89.7 | 93.3 |
| | 5.5 | 47.0 | 54.3 | 60.7 | 66.5 | 71.8 | 76.8 | 81.4 | 85.9 | 90.0 | 94.0 | <n.9 |
| | 6.0 | 49.1 | 56.7 | 63.4 | 69.5 | 75.0 | 80.2 | 85.1 | 89.7 | 94.0 | 98.2 | 102.2 |
| | 6.5 | 51.1 | 59.0 | 66.0 | 72.3 | 78.1 | 83.5 | 88.5 | 93.3 | 97.9 | 102.2 | 106.4 |
| | 7.0 | 53.1 | 61.3 | 68.5 | 75.0 | 81.0 | 86.6 | 91.9 | 96.9 | 101.6 | 106.1 | 110.4 |
| | 7.5 | 54.9 | 63.4 | 70.9 | 77.7 | 83.9 | 89.7 | 95.1 | 100.3 | 105.1 | 109.8 | 114.3 |
| | 8.0 | 56.7 | 65.5 | 73.2 | 80.2 | 86.6 | 92.6 | 98.2 | 103.5 | 108.6 | 113.4 | 118.1 |
| | 8.5 | 58.5 | 67.5 | 75.5 | 82.7 | 89.3 | 95.5 | 101.3 | 106.7 | 111.9 | 116.9 | 121.7 |
| | 9.0 | 60.2 | 69.5 | 77.7 | 85.1 | 91.9 | 98.2 | 104.2 | 109.8 | 115.2 | 120.3 | 125.2 |
| | 9.5 | 61.8 | 71.4 | 79.8 | 87.4 | 94.4 | 100.9 | 107.0 | 112.8 | 118.3 | 123.6 | 128.7 |
| | 10.0 | 63.4 | 73.2 | 81.9 | 89.7 | 96.9 | 103.5 | 109.8 | 115.8 | 121.4 | 126.8 | 132.0 |
| | 10.5 | 65.0 | 75.0 | 83.9 | 91.9 | 99.2 | 106.1 | 112.5 | 118.6 | 124.4 | 129.9 | 135.3 |
| | 11.0 | 66.5 | 76.8 | 85.9 | 94.0 | 101.6 | 108.6 | 115.2 | 121.4 | 127.3 | 133.0 | 138.4 |
| | 11.5 | 68.0 | 78.5 | 87.8 | 96.2 | 103.9 | 111.0 | 117.8 | 124.1 | 130.2 | 136.0 | 141.5 |
| | 12.0 | 69.5 | 80.2 | 89.7 | 98.2 | 106.1 | 113.4 | 120.3 | 126.8 | 133.0 | 138.9 | 144.6 |
| | 12.5 | 70.9 | 81.9 | 91.5 | 100.3 | 108.3 | 115.8 | 122.8 | 129.4 | 135.7 | 141.8 | 147.6 |
| | 13.0 | 72.3 | 83.5 | 93.3 | 102.2 | 110.4 | 118.1 | 125.2 | 132.0 | 138.4 | 144.6 | 150.5 |
| | 13.5 | 73.7 | 85.1 | 95.1 | 104.2 | 112.5 | 120.3 | 127.6 | 134.5 | 141.1 | 147.3 | 153.4 |
| | 14.0 | 75.0 | 86.6 | 96.9 | 106.1 | 114.6 | 122.5 | 129.9 | 137.0 | 143.7 | 150.0 | 156.2 |
| | 14.5 | 76.4 | 88.2 | 98.6 | 108.0 | 116.6 | 124.7 | 132.2 | 139.4 | 146.2 | 152.7 | 158.9 |
| | 15.0 | 77.7 | 89.7 | 100.3 | 109.8 | 118.6 | 126.8 | 134.5 | 141.8 | 148.7 | 155.3 | 161.7 |
| | 15.5 | 78.9 | 91.2 | 101.9 | 111.6 | 120.6 | 128.9 | 136.7 | 144.1 | 151.2 | 157.9 | 164.3 |
| | 16.0 | 80.2 | 92.6 | 103.5 | 113.4 | 122.5 | 131.0 | 138.9 | 146.4 | 153.6 | 160.4 | 167.0 |

The wall thickness can be matched to an efficient frequency, but a range of useful frequencies can be workable, with minimal loss of economy. Typically, the wall thickness is greater than 10% relative to the outside diameter (OD). If the wall thickness is less than 10% relative to the OD, the conversion efficiency of RF energy to radiant infrared heat may be very low for heating the susceptor. All substantial energy absorbed in the sinter process will be thermal radiation. In an embodiment the thermal radiation will be infrared thermal radiation. The workpiece or workpiece environment will be bounded by a cylindrical tube or sleeve, the susceptor, capable of providing an oxidizing, neutral, reducing, or vacuum atmosphere to the workpiece. The workpiece or object's environment will be substantially transparent to the induction field. Exemplary materials for construction of the susceptor are, for example, materials such as carbon and its allotropes, molybdenum, platinum, alumina, silica, or silicon carbide.

The wall thickness of the cylindrical susceptor will adjusted to the RF frequency first by ensuring the thickness is greater than 10% of the overall outside diameter of the cylindrical susceptor tube. As the wall thickness is reduced the frequency can be increased. As the overall diameter of the susceptor is increased the frequency is reduced. Thereby increasing heating efficiency and shielding the workpiece or workpiece from the magnetic field. In embodiment the wall thickness may be greater than 10, 11, 12, 13, 14, 15, 16, 17, or 19% of the outside diameter (OD) of the cylindrical susceptor but less than 20% of the OD. Excessive wall thickness reduces the heating rate duration as well as reducing the volume available for the target workpiece during the debinding and sintering processing by the susceptor. The susceptor cylinder should fit over the environmental or process tube providing at least ⅛-inch clearance to provide for thermal expansion of the susceptor cylinder structure.

The power developed in the susceptor varies as the square of the voltage impressed on the coil. The distribution of this current in the wall of the susceptor depends upon the supplied electrical frequency, electrical size and the electrical and magnetic properties of the material comprising the susceptor, It is useful to choose a frequency that utilizes an appropriate portion of the wall thickness that is chosen to shield magnetic fields from being induced in the center of the susceptor in any meaningful amount. This frequency is where the ratio of the OD of susceptor cylinder to the reference depth (wall thickness) is greater than (>) 4 to 6 but less than (<) 10 to 12. Within this range susceptors with a $T/a_0$; where T is equal to the cylinder or sleeve wall thickness and $a_0$ is equal to the outside diameter (OD) of the cylinder, range from greater than 0.1 and less than approximately 0.5. These parameters for the susceptor, in this embodiment a cylinder or sleeve, provides good electrical efficiency for the susceptor to provide thermal infrared radiation to both debind and sinter the workpiece and effective shielding of the workpiece or workpiece from stray energy fields during the debinding and sintering process. See Eq. 1:

$$d = 3160\sqrt{P/\mu f} \qquad \text{Eq. 1}$$

d=reference depth or thickness of RF receptor (susceptor) layer
  P=resistivity in ohm-inches
  µ=relative magnetic permeability
  f=frequency in cycles per second In an embodiment, the ratio of the reference depth to the OD, the wall thickness of the open cylinder or sleeve forming the susceptor to the outside diameter of the cylinder or sleeve, is 0.40, 0.35, 0.30, 0.25. 0.20, 0.15, or 0.10. Optimal lengths of the susceptor is determined by a function of 1) the inside diameter of the susceptor coil divided by the length of the susceptor coil, and 2) the outside diameter of the susceptor coil divided by the inside diameter of the susceptor coil. This ratio can never be greater than 1 and in some embodiments the ratio is 0.8, 0.6, 0.4, 0.3, or 0.2. In an embodiment, thorough radiant infrared heating has useful smaller ratios of 0.6, 0.4, 0.3, or 0.2. This ratio is often labelled the "shortness correction". Other shapes for the susceptor such as, for example, cubes, rectangles are useful depending on the workpiece receiving the radiant heat. Calculations for these shapes are different than for a susceptor in a cylinder or sleeve configuration. Other factors of consideration are RF frequency, current, number of coils and the electrical properties of the susceptor material used to optimize heating. A useful shape for the susceptor is a "push through tube" of the correct dimensions to contain the workpiece, article, or object. Visually, this is a tube presented in a horizontal plane.

In one embodiment, a useful susceptor has a length of 6 inches, and OD of 2.75 inches, and a wall thickness of 0.425 inches. The ratio (thickness:OD) is 0.154545. In an embodiment the susceptor is a sleeve or cylinder of graphite. The frequency is 68±1 Khz and the duration from heat-up from ambient to about 1400-2000° C. to cool down is approximately 3 to 8 hours. This embodiment is effective in shielding the workpiece or workpiece from stray energy heating fields such as, for example, eddy currents.

The operating temperature of the susceptor and the uneven cooling from the local environment requires the susceptor be thermally isolated from the inductor coil(s). However, the further away the coil is from the susceptor the less power is developed for the debinding and sintering processes targeted for the workpiece or object. The use of low thermal conductivity insulation can minimize the distance from the inductor coils to the susceptor. The ratio of the outside diameter (OD) of the susceptor coil or cylinder to the inside diameter of the inductor coil, and the ratio of the inside diameter of the inductor coil to its length establishes the efficiency of the power transfer. These calculations are often referred to as the "shortness factor". In an embodiment the insulation is thick enough to maintain a susceptor temperature of 500 to 2000° C. for generated thermal infrared radiation and an inductor coil temperature of below 250° C. In another embodiment the susceptor temperature is 1400 to 1500° C. and an inductor coil temperature of below 250° C. Useful insulation materials are from Zircar Zirconia Inc. (Florida, NY). In an embodiment Buster Alumina Ceramic fiber boards from Zircar Zirconia, 1 inch thick, are used to isolate the inductor coil from the susceptor.

In contemporary induction heating an inductor is a passive electrical component that stores energy in a magnetic field when alternating current (AC) electric current flows through it. Heat is generated on the workpiece or workpiece by eddy currents from the induced magnetic fields. However, in the embodiments of the disclosure, the disclosed susceptor shields stray energy fields from affecting the workpiece, article or workpiece from the magnetic fields that produce eddy currents, hysteresis, or the like. The induction heater consists of a coil, and an electronic oscillator that passes a high-frequency alternating current through the coil and a susceptor.

As a general summary, sintering occurs at temperatures below melting of any solid phase by movement, diffusion, of atoms through the microstructure of the material to produce density-controlled workpieces or parts from metal and/or ceramic particulate by application of thermal energy. Not being bound by theory, this movement of atoms can be caused by a gradient of chemical potential—atoms move from an area of higher chemical potential to an area of lower chemical potential. The paths the atoms can take to get from one location to another are the sintering mechanisms. The sintering process focuses to provide sintered parts with uniform and designed microstructure through management of sintering variables. Microstructural management means the control of grain size, sintered density, and size and distribution of other phases including pores is designed into the workpiece or part. Good microstructure of the workpiece should provide a fully dense body with a fine grain structure with limited or controlled porosity and a density approaching that of a solid workpiece or part. Sintering temperatures range from 500 to 2000° C. or 800 to 1500° C., over a duration of 1 to 36 hours. This duration includes a ramping up of 5 degrees/min over 4 to 6 hours, a holding time of 1.5 to 8 hours and a cooling time of 2 to 6 hours including time for debinding and tempering of the workpiece. In some embodiments, the pre-heating and sintering zone may be combined.

The useful temperatures for hardened metals or iron and iron alloys typically range from about 500 to 2,000° C., often from 800 to 1500° C. or 1100 to 1300° C. For aluminum alloys the temperatures typically range from around 400 to 800° C. or 590 to 620° C. For copper and copper alloys the useful temperatures tend to range from about 500 to 1000° C. or 750 to 1000° C. For brass alloys, the useful temperatures tend to range from about 850 to 950° C. For bronze alloys the useful temperatures tend to range from about 740 to 780° C. For iron and iron alloys including steel, the time for effective sintering including a preheating step, defining step and final heating ramp to the final sintering temperature. And the time needed to cool the workpiece to ambient, can range from eight to 36 hours often ten to 24 hours. For copper and cover alloys, the overall time can range from about six to 30 hours or about eight to 20 hours. And for aluminum and aluminum alloys the time for sintering typically ranges from about four to about 36 hours and often about five to 20 hours.

In general, there are two different types of sintering processes called solid state sintering and liquid phase sintering. Solid state sintering has a powder compact densified entirely within a solid phase. Liquid phase sintering has a liquid phase present in the powder compact during sintering. Six common sintering mechanisms are thought to be 1) Surface diffusion—diffusion of atoms along the surface of a particle, 2) Vapor transport—evaporation of atoms which condense on a different surface, 3) Lattice diffusion from surface—atoms from the surface diffuse through lattice, 4) Lattice diffusion from grain boundary—atoms from grain boundary diffuses through lattice, 5) Grain boundary diffusion—atoms diffuse along grain boundary, and 6) Plastic deformation—dislocation motion causes flow of matter. The first three mechanisms are non-densifying, leaving, for example, the basic structure of the material unchanged relative to a change in porosity. The last three mechanisms are densifying mechanisms. Atoms are moved to the surface thereby reducing or eliminating porosity and thereby increasing the density of the material. The artist's schematic figure below, FIG. 3A to 3C, shows how a densifying process among compacted metal containing interfacial modifier (IM) coated particulate that is distributed throughout workpiece may work.

Interfacially modifying chemistries can modify the surface of the particulate populations by a variety of means to aid in sintering. For example, there may be coordination bonding, Van der Waals forces, covalent bonding, or a combination of all three at the surface of the particulate with the interfacial modifier. The interfacial modifier will be completely and uniformly associated with the surface of the particulate distributed throughout the article, workpiece, or part.

The interfacial modifier coating provides the ability to pack higher volumes mixed sizes of particulate to above 70, 72, 74, 82, 87, 88, or 90 volume percent (vol. %) particulate packing prior to beginning the sintering process, this higher volume packing leads to a much-improved sintered workpiece with improved physical characteristics in comparison to uncoated particulate making a sintered part. Such physical characteristics, such as, for example, tensile properties, elastic constants, hardness, and corrosion resistance are conform to MPIF Standard 35, 2016 Edition "Material Standards for Metal Injection Molded Parts".

In some instances, the surface of the particulate will be completely coated by the interfacial modifier. After treatment with the interfacial modifier, the surface of the particle behaves as a particle of the non-reacted end of the interfacial modifier. Thus, the interfacial modifier associates with the surface of the particle and in some cases the chemistry of the interfacial modifier may form bonds with the surface of the particle thereby modifying the surface energy of the bulk particulate relative to the surface characteristics of the interfacial modifier. However, the interfacial modifier surface formed on a particle is non-reactive to other particles with a similar interfacially modified surface as well as non-reactive to the optional polymer matrix.

The interfacial modifier on a particle surface can cooperate in the sintering process to the level of fusing or associating with other interfacial modifier coatings on other particles throughout the entirety of the workpiece to form the sintered article. The interfacial modified surfaces that fuse or sinter may be the same or different relative to the organo-metallic interfacial modifier material used in the coating of the particulate. Further, the grain boundary, the interface between particles, and the interfacial modifiers non-volatile residue may fuse or sinter as well reducing porosity and increasing density of the sintered workpiece or part. The reduced porosity resulting in increased densification of the workpiece comprising the non-volatile residue of the interfacial modifier can be measured in comparison to a workpiece that does not have an interfacial modifier with a metal particle core as a coating on the particulate.

The IM coated, unsintered particulate workpiece body is sequentially pre-heated and then sintered. During the pre-heating process various chemical volatiles, polymer binder and other additives, are removed from the workpiece body to make a sintered workpiece. During the sintering process of the sintered workpiece, atomic transport events, fusing, are formed between the metal particle cores comprising the IM coating on the particulate distributed throughout the entirety of the part or workpiece. Parts and workpieces may be directly formed without further reheating and re-handling. The pre-heating and sintering zones are configured so that radiant infrared heat or thermal energy surrounds or envelopes the particulate comprising the workpiece from all sides of the workpiece or part. Such heat uniformly penetrates the particulate comprising the workpiece to its interior. In an embodiment, infrared heat energy flows from the bottom, top, left and right in the interior of the pre-heating and sintering apparatus towards and around the part or workpiece. Substantially no stray heating energy fields, such as, for example, eddy currents, and the like, are generated on the surface or throughout the interior of the workpiece More particularly, the pre-heating zone for the workpiece body may be heated by substantially radiant infrared energy. Further, the workpiece(s) may be raised and aligned simultaneously into a radiant heating relationship with the susceptor. The workpiece is heated by substantially radiant heat at a controlled amplitude. The workpieces or parts are progressively raised to a temperature enough to expel the volatiles. These volatiles are removed by the exhaust vent using process gas.

Each inductor coil may be independently powered and monitored to provide for accurate control over the rate of temperature increase of the susceptor. Within the pre-heating zone there may be different inductors to modulate the heating cycle efficiently. After pre-heating, the workpieces, or parts, are advanced from the pre-heating zone to heating or sintering zone.

In a similar manner, the pre-heated unsintered workpieces are positioned into alignment and location with another set of inductor coils and susceptors. This location is the optimal position for sintering the workpiece or part. The inductor coils are located above and/or beneath and on either side, left and right, of the pathway carrying the "brown" workpiece or part. The sintering zone is supplied with the desired environmental atmosphere such as, for example, vacuum, oxidizing or reducing or inert gas, at a flow rate enough to maintain steady state conditions. The induction coil heats the workpiece via the susceptor by radiant infrared heat energy as generated by, for example, radio frequency energy, from the inductor coils. The radiant heat generated is especially effective for providing complete, uniform heating throughout a complex shaped workpiece with highly packed particulate and is most efficient in sintering or fusing the metal particle cores of the interfacial modifier coating material located on the surface of the particulate comprising the workpiece or part.

In an embodiment the workpiece comprises particulate of a volume packing greater than 70 vol. %. The workpieces (or parts) after heating, may be lowered and then advanced by the conveyor depositing the final, completely sintered workpiece at an unloading station for automatic or manual transfer to a downstream finishing operation. During this final step, the sintering environment is returned to normal by an exhaust vent. The reducing or oxidizing material used in the environment may be recaptured and re-used. This procedure using induction heating is relatively quick compared to conventional furnaces such as flame heating or traditional ovens and furnaces. In an embodiment, the induction heating procedure can take as little as 4 to 6 hours in comparison to conventional furnaces of 8 hours or longer. The processed workpieces or parts are thus paced efficiently and controllably, heated in separate or the same pre-heating and sintering environments, and discharged at a measured rate with a minimum handling. The sintered workpiece(s), with the metal particle cores of the interfacial modifier coating on the particulate are fused throughout the part or workpiece and are immediately suitable for further, finishing operations.

The operation of the apparatus will be described with reference to the conveying when workpieces or parts are located at all the various positions taken in conjunction with the Figures. In an embodiment of the claimed furnace wherein the workpieces or parts are conveyed or shuttled through the pre-heating and sintering zones. Time and temperatures within each zone depend on the configuration of the workpieces or parts, the volume percent packing of the particulate or powder, and the physical properties required for a finished workpiece or part.

The sintering flow can be a linear process moving from location to location in each of the zones. The sintering process would start at the pre-heating zone and finish with exiting the sintering zone.

The sintering flow can be a circular process moving from location to location in each of the zones but exiting from the same entry or beginning location in the pre-heating zone. The sintering process would start at the pre-heating zone and finish with exiting the sintering zone.

The sintering flow can be a "back and forth" process where the pre-heating and sintering zones are combined. The workpiece is moved from location to location in one zone, but the heating and timing durations are different depending on whether the workpiece is at a pre-heating or sintering stage for the particulate or powder. The sintering process would start at the pre-heating zone and finish with exiting the sintering zone or optionally the pre-heating zone.

The workpiece is placed on a stage, and the stage may be a moveable shuttle or conveyor. Additionally, the shuttle or conveyor may be moveable in a vertical as well as a horizontal direction to permit the workpiece to be closer or farther from the susceptor surface. The shuttle may comprise lifting arms or lowering arms and all have non-magnetic and non-Rf properties to prevent the generation of stray heating fields induced on the workpiece or object, so as radiant infrared heat is uniformly applied to the workpiece. The differences in any of the embodiments would be in temperatures, time, exhausting volatiles during pre-heating, and sealing for vacuum, inert or reducing gases during treatments in the pre-heating and sintering zones to the benefit of the final workpiece article.

EXAMPLE 1

A composite, comprising about 95.43 wt. % 316 stainless steel particulate, particle size 10 to 125 microns with less than 90% being 10 microns or less, coated with 0.75 wt. % of an interfacial modifier on the particles. The coated particles are dispersed into 4.82 wt. % of an immiscible mixture of the polymers polyoxymethylene (POM) and polypropylene (PP). The result was formed into pellets. The pellets were injection molded into a 46 g. dogbone tensile test piece. The tensile test piece was sintered at a AC frequency of about 68±1 kHz, at a temperature profile of ambient to 1411° C. in 80 minutes, maintained at 1411° C. for 90 minutes and then cooled to 70° C., over 180 minutes, in a hydrogen atmosphere that flowed at a rate of 1000 $cm^3 \cdot min^{-1}$ in a furnace as shown in FIG. 1. The density of the resulting steel workpiece was 7.838 $g \cdot cm^{-3}$ as measured by water displacement. The density of 316 and 316l stainless steel is 7.99 $g \cdot cm^{-3}$. This result shows that the sintering was complete, substantially all polymer was removed, and no deficits were seen in the steel member.

EXAMPLES 2-7

A composite material of 83 vol. % interfacially modified spherical 316 L stainless-steel in polypropylene was used for the sintering development. The binder used in the formulation is a moderate molecular weight polypropylene homopolymer sourced from PolyOne distribution and accounts for 2.4 wt. % of the composite formulation while the interfacially modified (0.7 wt. % on the particle) stainless steel comprises the balance (97.6 wt. %). An interfacial modifier was applied to the stainless-steel particles. The stainless-steel particulate phase comprises a 316L stainless steel alloy using a bimodal distribution of large and small spherical particle phases of large:small @ 3:1 vol:vol. The large particles are +38 to −106 micron and the small are $D_{90}$<10 micron. The as formulated composite possesses a theoretical density of 6.4 g/cc.

The polymer and modified particulate were fed into a 26 mm twin screw Coperion® compounder via K-Tron® weight loss feeders and pelletized via a Conair strand pelletizer to make a pellet for injection molding. The pelletized material was then injection molded into six identical MPIF dog-bones using a Gluco® VSX-10 (10 ton/0.5 oz shot size) vertical injection molding machine making green workpiece dogbones. The parts as molded have a green workpiece density via water displacement of approximately 6.3 g-cm$^{-3}$. The green parts were debinded in a forced air oven at 150° C. for 48 hours to obtain the brown (ready to sinter) state.

A single workpiece was sintered per sintering cycle. A brown state workpiece was taken and placed on a sintering plate (Coors-Tek P6C) that was previously sprinkled with alumina powder to prevent any sticking of the workpiece to the plate during sintering. The plate was placed into the induction furnace as shown in FIG. 1 and sintered. Temperature control and gas flow within the induction furnace sintering environment occurring around the part. The sintering plate was placed in the alumina tube which has a hydrogen gas (Praxair) flow of 1 L-min$^{-1}$ passing through it. Note also a nitrogen gas purge was used to evacuate the tube before and after the sintering cycle to purge the hydrogen from the tube—this was done since the exhaust hydrogen was eliminated via a lit flame at the exhaust port of the tube. The alumina tube is surrounded by a carbon susceptor which is in turn concentrically insulated with high performance mineral insulation. A quartz tube concentrically jackets the outside of the insulation to provide structural support to the insulation and provide a gas impervious vessel along the sides of the furnace to contain the susceptor protecting nitrogen purge gas (described below). An induction coil surrounds the quartz tube providing the energy source to enable heating the graphite susceptor and thusly radiatively heating the alumina tube and its contents. A nitrogen gas was used to purge the air environment around the graphite susceptor located between the quartz and alumina tubes at a flow rate of 0.8 L-min$^{-1}$. This was done to minimize degradation of the graphite susceptor that occurs under ambient gas conditions whilst at elevated temperature. The coil is 5.25-inch ID×6.625-inch length with 12 turns of 0.375-inch copper tube. The power supplied to the coil uses 13.5 A/196V/68 KHz. Note that the power supply was running 14% of capacity. The tank circuit used a 21:1 transformer with three 1.3 µF capacitors (parallel configuration). Parts were heated at a target ramp rate of 10 and 12° C. per minute to about 1400° C. followed up with a 90-minute soak at a target maximum temperature between 1400 and 1407° C. Temperature control stopped at the end of the 90-minute hold and the workpiece was cooled to ambient.

Figure 4:
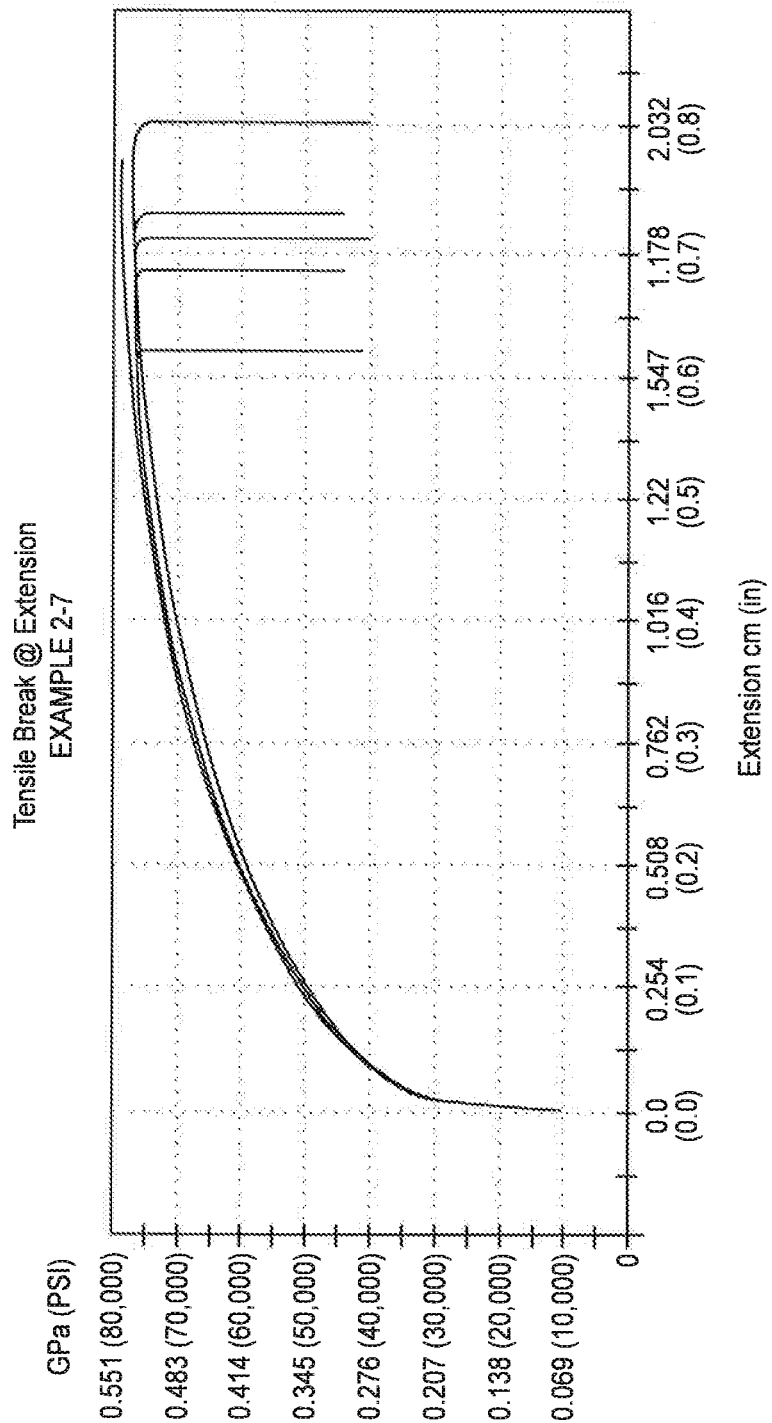
FIG. 4 is a graphical representation of tensile stress at elongation.

Tensile strength was measured using a universal testing machine and with the results depicted in FIG. 4. The one-inch strain length inherent to the sintered dog-bones allows the x-axis to be directly converted into percentages (((inch displacement/1.00 inch))*100). The samples exhibit about 60 to 80% elongation at break and about 0.52 to 0.55 GPa (75,000 to 80,000) pound-force per square inch stress at break. Lengthwise shrinkage was about 8.3% (green to sintered). Sintered density was measured using water displacement and determined to be around 7.84 g/cc. The appearance of the sintered parts was excellent. The density tensile property and appearance was seen to be a duplication of a forged steel part.

DETAILED DESCRIPTION OF FIGURES

FIG. 1 is a longitudinal cross-section of the cylindrical or hollow sleeve Furnace apparatus 100. Furnace 100 has a centrally located Heating Zone 110 that is formed in the annular space of Environmental tube or Process Tube 122. Heating Zone 110 is further defined by internal Insulation Inserts 116a and 116b which help to maintain the constant and well-controlled temperature derived from radiant infrared energy within the Heating Zone 110 that is sufficient to cause the complete formation of the workpiece from a polymer and particulate composite structure (not shown) and further insulates the balance of the Furnace 100 from the temperatures maintained within Heated Zone 110. Surrounding the Process Tube 122 and the Heated Zone 110 is Susceptor 113. Susceptor 113 is heated by Induction coils 111, which using AC at kilohertz energy, induce the Susceptor 113 to provide infrared thermal energy to heat the zone 110 within the process tube 122 and any workpiece or part therein (not shown) to a consistent uniform temperature within the Heating Zone 110.

The Susceptor 113 and the Process Tube 122 are supported by bulkheads 120a and 120b. The process tube 122 is fixed within bulkheads 120a and 120b using an annular space within the bulkheads fitting the exterior of the Process Tube 122. The Process Tube 122 is constructed from materials that is transparent to Rf energy and does not generate or add to the magnetic field around or within the susceptor. The interior bulkheads 120a and 120b are further supported and contained by containment Vessel 118. The circular bulkheads 120a and 120b fit within the annular space within the cylindrical containment Vessel 118. The Process Tube 122 is further supported by exterior bulkheads 119a and 119b that in turn have an annular space supporting the Process Tube 122 which is shaped and configured to fit precisely within the diameter of the bulkheads. The exterior bulkhead annular Spaces 123a and 123b along with interior bulkhead annular Spaces 124a and 124b are typically sized identically to support the cylindrical Process Tube 122. Filling the volume within the containment Vessel 118 is an Insulation cylindrical layer 117 which is shaped and configured to fill the volume within the containment vessel and insulate the exterior of the Process Tube 122 and the Susceptor 113 from the exterior and from containment Vessel 118. Examples of material useful for the insulation layer are alumina or zirconia-based temperature resistant material. Other material with non-magnetic and non-Rf properties may be useful insulators as well. The excluded volume of Insulation layer 117 is filled with an inert Purge Gas 115 and 115a and 115b to reduce the effects of the extreme heat on the stability of the installation. The ends of the Process Tube 122 are sealed with Seals 121b and 121c to ensure that the interior of the process tube is separated from ambient atmosphere. Into the annular space of the Process Tube 122 is introduced Process Gas (not shown) through tube 114 which is introduced into the Heating Zone 110 to aid in the successful sintering of the sintered workpiece or part (not shown). The tube 114 must be of a material that can resist the temperature extremes of the susceptor material and the heating zone 110 and can be made from alumina, silicon carbide or other similar non-RF active material. Similarly, the bulkhead materials 124b, 124a can be made of materials like that of the process vessel, while bulkheads 123*a* and 123*b* can be made of material like the exterior containment vessel 118. Other insulation and structural components of such a furnace can be made from conventional materials that have a temperature resistance that match its usage. The heating zone 110 within process tube 122 typically contains a stage or treatment location (not shown) which is made of material that can withstand the temperatures common to the heating zone but can support the workpiece during the sintering operation. The material of said stage would have characteristics like those of the process tube 122. Such stages are typically horizontal planar surfaces that can be fixed in place inside the process vessel or can be configured with supports that maintain the stage at a horizontal attitude. Such a stage can also be moveable in horizontal or vertical planes.

In one mode of operation, the furnace 100 and susceptor 110 can be operated in a substantially reduced pressure mode such that the ambient atmosphere is substantially removed from the furnace 100 and the heating zone 110 before operation begins. In this mode, the furnace can be connected to a vacuum source, which can remove ambient atmosphere from the components of the furnace.

The furnace 100 as shown in FIG. 1 is substantially circular or cylindrical. The furnace, however, can be of any geometry including a three-dimensional tubular structure that can have a cross section that is circular, oval, triangular, square, pentagonal, hexagonal, or other regular or irregular polygonal cross-section. The furnace is typically sized to sinter any practical workpiece. Typically, the length of the furnace is greater than about 5 mm, 100 mm and can be about 5 mm to 100 cm in diameter enough to contain a substantial heating zone. The heating zone typically has an internal volume of greater than about 1,000 cm$^3$ or about 2000 to about 20,000 cm$^3$. In a circular cross-section tubular furnace, the heating zone 110 diameter can be greater than about 20, 30, 100, 200, 500 mm, or 100, 200, or 500 cm. Similarly, the outside tubular container for the furnace can have a volume of at least about 5000 cm$^3$ or about 5000 to about 100,000 cm$^3$, and its radius in a circular cross-sectional tubing is about 100 mm to 10 cm. In some embodiments the tube container can have a 100 cm inner diameter and be up to 100 cm long. The furnace and RF coil are configured and adapted to first obtain a uniform radiant thermal heat distribution and to minimize or prevent creating any stray RF fields inside the heating zone. In this configuration the workpiece is uniformly heated by thermal energy and not by RF induction heating inside the heating zone.

Figure 2:
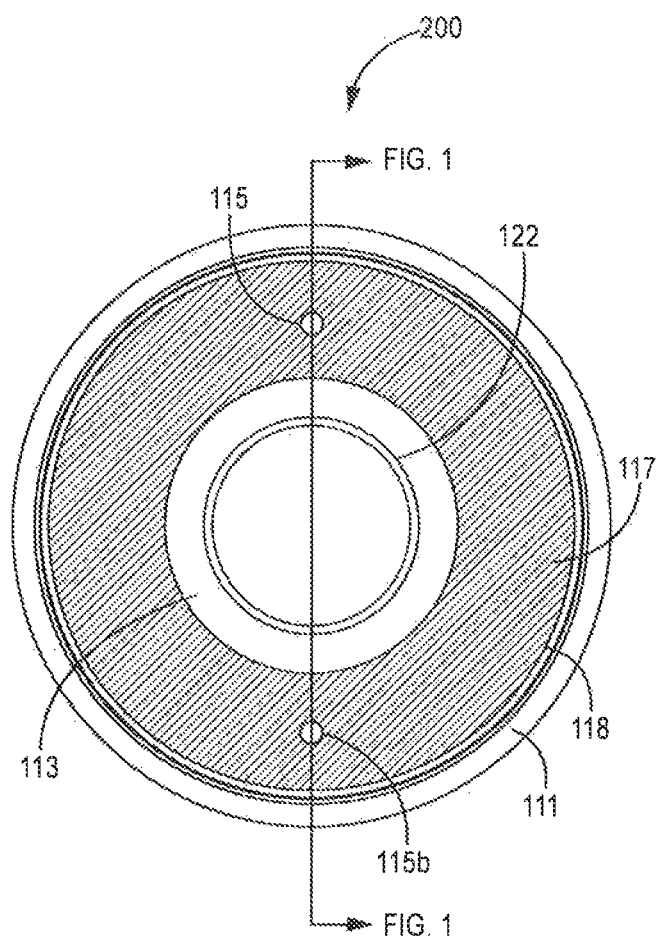

FIG. 2 shows a cross section at the midline of the furnace 200 of FIG. 1. FIG. 2 shows the Process Tube 122 surrounded by Susceptor 113 which is enclosed by Insulation 117 which in turn is enclosed by containment Vessel 118. The entire structure is heated by encircling induction coil 111 by inducing radiant infrared energy as heat from Susceptor 113. Within the Insulation 117 are Purge Gas Lines 115 and 115*b*. The Process gas conduits do not appear in this cross section. The materials used for making the supporting structures, such as the Process Tube, bulkheads, etc., around the susceptor have non-magnetic and non-Rf properties to prevent the generation of stray heating fields, such as, for example, eddy currents and the like, induced on the workpiece or workpiece that would negatively affect the radiant infrared heat uniformly enveloping and heating the workpiece.

FIG. 3A-3C is an artist's representation of the capacity of the technology to obtain high packing fractions and high density of the particulate first in the workpiece prior to sintering and in the fused workpiece post sintering.

FIG. 3A shows a mono disperse particulate collection, 131*a*, with the excluded volume 132. Once the initial pre-sintered, "green" piece, workpiece is formed, it is made from a loose powder, but at its initial stage the IM coated particulate becomes self-ordered with minimal excluded volume 132 and 132*a* and increases the bulk density or packing fraction of the particulate. Once sintering begins, the particulate passes through an intermediate stage wherein particles are heat fused at the particle surface to adjacent particles obtaining reduced excluded volume 133 and partially fused particle 137. As the sintering becomes more complete, the final stage results in a highly dense metal workpiece with minimal excluded volume (void spaces) 134 within the fused workpiece of fused particles 138.

FIG. 3B shows the similar assembly of a loose powder, except that this loose powder is a bi-modal distribution of particulate, wherein large particles 131*a* and 131*b* and smaller particle 135 are combined as a result of the reduced excluded volume 132*a* results in a better initial packing density or packing volume. Sintering such a structure can obtain a final workpiece having greater density than that from a mono-disperse loose powder.

FIG. 3C shows a loose powder having tri-modal or three different particle sizes in the loose powder. In 3C, the larger particle, 131*a*, is combined a second particle, 135, of a smaller intermediate diameter, which is in turn combined with a still smaller particle, 136. Similarly, to FIG. 3B, sintering this loose powder having a mixture of three particles of different sizes still further increases final product density with minimal excluded volume 132*b*.

The power supply (not shown) is engineered to provide radio frequency energy at a frequency from about 100 hertz to 900,000 hertz. At these frequencies, the coil can deliver from about 1 to 100 kilowatts to the susceptor for heat generation. The coil is typically a highly conductive copper, and, in a useful mode, the coil is prepared from copper tubing through which a coolant flows to maintain the copper at a workable temperature, typically about less than 250° C. The coil can sustain use to approximately 50 AC amps current through a very low resistivity coil structure. As noted, the coil is positioned outside the process tube and is registered to be coextensive with the susceptor structure. The coil is typically not smaller than the susceptor and often can be 1 to 15% longer than the susceptor structure to ensure the heating zone is at maximum uniform temperature. These geometries ensure that the coil delivers the appropriate power to heat the susceptor to the appropriate sintering temperatures. In the cylindrical version of the furnace the external containment vessel can be made from a heat resistant material that can maintain the structural integrity up to the temperatures experienced by the container, which is protected by the insulation layer.

The gases used in the claimed furnace can be either a purge gas in conduit 115 or a process gas through conduit 114. The purpose of the purge gas is to protect the furnace components from being degraded during high temperature periods during furnace usage. The process gas is typically a reducing gas that cooperates in the sintering of the work piece. Sufficient linear velocity for the process gas can be from about 25 to 50 cm·min$^{-1}$ or 25 to 1000 cm·min$^{-1}$ sufficient to maintain a constant atmosphere within the heating chamber 110 but also with sufficient flow rate to remove volatile components removed from the workpiece during the sintering heating process.

The purge gas flow rate is simply enough to stabilize the internal components of the furnace outside the heating zone to the harmful effects of high temperature heating and can be about 200 to 1000 cm$^3$·min$^{-1}$ per minute to about 300 to 700 cm$^3$·min$^{-1}$. Owing to the high temperature of the internal components of the furnace, the gas process and purge conduits must be made of relatively high temperature stable materials.

The purge gas is typically introduced into the interior of the furnace outside the heating zone 110 and is released throughout the internal portion of the furnace to fully contact and blanket the entire furnace interior. As such, the conduits can be perforated or branched wherever needed to ensure the conduits do not become plugged and fail to introduce an enough blanketing gas into the interior. The conduit 114 for the process gas must penetrate the heating zone to introduce process gas into the heating zone, but also most penetrate the heating zone to provide an exit to the exterior of the furnace.

FIG. 4 is a Graphical representation of tensile stress in gigapascals (GPa) at elongation in centimeters of sintered sample parts. The samples exhibit about 60 to 80% elongation at break and about 0.52 to 0.55 GPa (75,000 to 80,000 pound-force per square inch) stress at break. Lengthwise shrinkage was about 8.3% (green to sintered). Sintered density was measured using water displacement and determined to be around 7.84 g/cc. The appearance of the sintered parts was excellent. The density tensile property and appearance was seen to be a duplication of a tough, forged steel part.

The density and temperature uniformity within the claimed induction furnace compared to the variation from a conventional tube furnace shows that the temperature varies in a conventional tube furnace has a substantially changing temperature profile. The sintering density that results from the varying temperature profile in the conventional furnace results in a poorer final object. Looking, however, at the heat in the heating zone of the claimed induction furnace, the heating zone has a substantially uniform temperature (greater than 90 vol. % or 95 vol %. of the volume of the heating zone is uniform) which will obtain the highest effective sintering of the workpiece as measured in the maximized density of the final workpiece.

TABLE 1

FIGS. Numbering

| FIG. 1 and 2 Number | Description | Note |
|---|---|---|
| 100 | Furnace | Generally cylindrical embodiment |
| 110 | Heating zone | Sintering and/or debinding temperature |
| 111 | Coil | Source of induction energy |
| 113 | Susceptor | Carbon cylindrical workpiece that heats in the presence of RF energy |
| 114 | Process gas input | Gas cooperates in sintering workpiece |
| 115 | Purge gas | Acts to reduce harmful heating of internal furnace components outside of the heating zone |
| 116 a, b | Insulation | Insulates and cooperates to maintain heating zone temperature and atmosphere. |
| 117 | Insulation | Maintains internal heating zone temperature and maintains relatively cool exterior. Non-magnetic and non-RF active. |
| 119 a, b | External bulkhead | Has a central circular opening that provides structural support for furnace components. Non-magnetic and non-RF active. |
| 120 a, b | Internal Bulkhead | Has a central circular opening 123 a, b that provides structural support for furnace components like the external bulkhead. Non-magnetic and non-RF active. |
| 121 b, c | Process tube 122 seals | Maintains a sealed environment. Non-magnetic and non-RF active. |
| 122 | Process tube | Supports susceptor and contains heating zone 110. Non-magnetic and non-RF active. The process tube can contain an optional stage or support (not shown) to hold the workpiece or object. In some embodiments this stage is moveable for a conveying or shuttle system (not shown) |
| 123a, b | | a central circular opening in 119 a, b that provides structural support for furnace components |
| 124 a, b | | a central circular opening in 120 a, b that provides structural support for furnace components |

| FIG. 3a -3C Number | Description | Note |
|---|---|---|
| 131 131a | Large particle | |
| 132 132a 132b | Excluded volume | |

TABLE 1-continued

FIGS. Numbering

| | |
|---|---|
| 133 | Lesser excluded volume |
| 134 | Minimal excluded volume |
| 135 | Medium size particulate |
| 136 | Smallest particulate |
| 137 | Partially fused particle |
| 138 | Fused particle in product |

In summary, the claimed induction furnace sintered test metal polymer composite cubes with a uniform heating zone that resulted in a test sintered metal cube that was not exposed to a gradient heat typical of contemporary sintering. The uniformity of the heat resulted in a test piece that was not stressed by non-uniform heating and obtained a density needed to produce steel-like tensile properties.

Many modifications of the above apparatus may be employed to achieve the benefits. For instance, rather than having a single longitudinal shuttle conveying system, a generally U-shaped configuration may be useful which will sequentially transfer the workpieces along the heating path for raising into heating relationship with the associated susceptor heating unit and discharging at the end thereof. A straight-line configuration using a reversing and advancing conveyor system may be employed where the pre-heating zone is re-used as a sintering zone for either single or multiple workpieces or parts. Separate exhaust and gas blanketing environments may be employed and recovered in the pre-heating and sintering zones. Further, inasmuch as the heating demands in the pre-heating zone are less than for the sintering zone, it may be desirable to employ other heating means such as flame heaters or ovens for raising the temperature of the workpieces prior to the sintering zone sufficient to drive off the volatiles prior to sintering. The entire system may be computer or mechanically controlled depending on the demands of production and the physical properties of the finished parts or workpieces.

The claims may suitably comprise, consist of, or consist essentially of, or be substantially free or free of any of the disclosed or recited elements. The claimed technology is illustratively disclosed herein can also be suitably practiced in the absence of any element which is not specifically disclosed herein. The various embodiments described above are provided by way of illustration and should not be construed to limit the claims attached hereto. Various modifications and changes may be made without following the example embodiments and applications illustrated and described herein, and without departing from the true spirit and scope of the following claims.

While the above specification shows an enabling disclosure of the composite technology, other embodiments may be made with the claimed materials.

We claim:

1. A furnace for sintering a workpiece, the furnace comprising:
   a) at least one inductor coil;
   b) at least one hollow cylindrical susceptor enclosing a process tube and an infrared heating zone containing a reducing atmosphere, the susceptor comprising a material capable of absorbing electromagnetic energy from the coil to generate radiant infrared heat and to shield the heating zone from incident RF heat;
   c) at least one insulating layer surrounding the susceptor; and
   d) a supply of power for said coil;
   wherein the process tube in the furnace is horizontally configured to maintain a flow of the reducing atmosphere to aid in sintering and remove volatiles from the furnace; the inductor coils are energized sufficiently to progressively raise the temperature of the susceptor to heat the heating zone by radiant infrared heat to an effective temperature of 800 to 1500° C. and the sintering temperature within the heating zone comprises a uniform heat distribution.

2. The furnace of claim 1 wherein the incident RF heating mechanism is a current induced in the susceptor producing IR heating in the substantial absence of an eddy current heating in the workpiece.

3. The furnace of claim 1 wherein the susceptor cylinder has a wall thickness of 0.5 to 2 centimeters.

4. The furnace of claim 3 wherein the ratio of the outside diameter of the susceptor to the susceptor wall thickness is greater than 4 but less than 12.

5. The furnace of claim 1 wherein the heating of the heat zone is by infrared heat and not by a current induced by radio frequency energy.

6. The furnace of claim 1 wherein the furnace has a construction consisting essentially of the inductor coil, the insulation layer, the susceptor and the process tube with heating zone therein.

7. The furnace of claim 6 wherein the insulating layer is a ceramic insulator.

8. The furnace of claim 1 wherein the coil is water cooled.

9. The furnace of claim 1 wherein the process tube comprises a silicon carbide coating.

10. The furnace of claim 1 wherein the susceptor comprises graphite.

* * * * *